United States Patent [19]

Siegle et al.

[11] Patent Number: 5,752,177
[45] Date of Patent: May 12, 1998

[54] RADIO RECEIVER, IN PARTICULAR A VEHICLE RADIO RECEIVER

[75] Inventors: Gert Siegle, Berlin; Peter Braegas, Hildesheim; Jürgen Kaesser, Diekholzen; Wadym Suchowerskyj, Hildesheim, all of Germany

[73] Assignee: Robert Bosch GmbH, Stuttgart, Germany

[21] Appl. No.: 133,145

[22] PCT Filed: Mar. 19, 1992

[86] PCT No.: PCT/DE92/00232

§ 371 Date: Oct. 15, 1993

§ 102(e) Date: Oct. 15, 1993

[87] PCT Pub. No.: WO92/19093

PCT Pub. Date: Oct. 29, 1992

[30] Foreign Application Priority Data

Apr. 19, 1991 [DE] Germany .......... 41 12 828.1

[51] Int. Cl.⁶ .................................. H04B 1/18
[52] U.S. Cl. .............. 455/186.1; 455/345; 340/905
[58] Field of Search ............... 455/185.1, 186.1, 455/228, 345, 344, 67, 70, 156, 166, 226, 89, 90; 379/58, 59; 340/988, 990, 905; 364/436, 443, 444, 449; 381/41, 51; 395/2.79, 2.86

[56] References Cited

U.S. PATENT DOCUMENTS

| | | | |
|---|---|---|---|
| 4,639,225 | 1/1987 | Washizuka | 455/344 |
| 4,682,223 | 7/1987 | Ragan | 380/16 |
| 4,862,513 | 8/1989 | Brägas | 455/45 |
| 5,001,775 | 3/1991 | Hayashi et al. | 455/186.1 |
| 5,095,532 | 3/1992 | Marous | 455/186.1 |
| 5,109,540 | 4/1992 | Szung et al. | 455/90 |

FOREIGN PATENT DOCUMENTS

| | | |
|---|---|---|
| 0 178 809 | 4/1986 | European Pat. Off. . |
| 35 36 820A1 | 4/1987 | Germany . |
| 39 27 993 | 9/1990 | Germany . |
| WO 90-13206 | 11/1990 | WIPO . |

OTHER PUBLICATIONS

Radio Electronics, 1988—"Radio Data System", pp. 65–68 & 76.

Kommunikationstechnik, D/Der Elektromeister + Deutches Elektrohandwerk, May 1989, pp. 323–325, "Autofahrer Navigationssystem für den Individualverkehr", L. Starke.

Telekommunikation, Funkschau 24/1988, pp. 41–45, "Mehr Sicherheit auch bei Btx", Von Klaus Milczewsky.

Blaupunkt Bosch Telecom, "RDS–Auto radios: The new generation for the new pan–European broadcasting," 8 pages describing models Köln RCM 40, Heidelberg RCM 40 & Montreux RCR 30, published in Hildesheim, Germany, FEB. 1991.

Peter Brägas, "With Traffic Guidance Systems against Total Traffic Collapse," Man Forum Magazine, Munich, Jan. 1991, pp. 2 and 27–29.

*Primary Examiner*—Nguyen Vo
*Attorney, Agent, or Firm*—Frishauf, Holtz, Goodman, Langer & Chick, P.C.

[57] ABSTRACT

A radio receiver, in particular a vehicle radio receiver, is proposed, which is able to display or output acoustically, traffic news which is contained in digital signals. At least the data memory for the decoding of the digital traffic news and of the display or the output in the correct language is contained on a chip card, which can be inserted into the radio receiver. This makes it possible that, on the one hand, a linguistically adapted output of traffic news is possible, and, on the other hand, in the event of changes in the road network, a simple adaptation without modification of the radio receiver is made possible. Finally, it facilitates the use of the radio receiver worldwide, since the chip card allows regionally specific or country specific local codes to be taken into account.

4 Claims, 2 Drawing Sheets

RADIO RECEIVER, IN PARTICULAR A VEHICLE RADIO RECEIVER

FIELD OF THE INVENTION

The invention relates generally to a Radio Data System (RDS) receiver and, more particularly, to an RDS receiver with a memory which can be updated by inserting a chip card.

BACKGROUND

From the paper by Peter Brägas "Guidance and Information Systems in the Motor Vehicle—A Contribution for the Improvement of Traffic Movement and of Traffic Safety", journal "International Traffic", book 5/85, a method for the route-selective reproduction of digitally coded traffic news is known, in which the traffic news itself is transmitted in code. Based on the coding, standard texts and place names will be called up, from which the traffic information is composed. From the DE-OS 35 36 820, a receiver for traffic messages can be understood, in which the local codes and the standard texts are stored in a read-only memory (ROM). This ROM thus forms a component part of the car radio and deciphers the transmitted codes and converts them into an intelligible language. For this purpose, the ROM has standard texts and local codes stored.

Another known car radio is the Blaupunkt Montreux RCR 30. This car radio has a decoder for digitally transmitted signals, which are sent out by a radio transmitter. The digitally transmitted signals in this radio are shown on a display unit. Furthermore, this car radio has a slot into which is inserted a chip card. The chip card contains a security code, which allows operation of the car radio only if the security code agrees with the security code stored on the chip card in the car radio. The chip card itself contains a resistance network, the value of which is interrogated by a computer in the car radio.

SUMMARY OF THE INVENTION

In contrast, the radio receiver in accordance with the invention, or the chip card in accordance with the invention, has the advantage that the data memory is easily exchangeable. This results in the radio receiver being adaptable in a particularly simple manner, to the linguistic aspects. It further opens up the possibility of taking into account the latest road conditions or local codes without opening the radio receiver, since it can happen during the lifetime of a radio receiver that place names are changed, and this can then be easily updated. A further advantage may be seen in the fact that even with a limited storage capacity, the radio can be used worldwide. By selecting suitable chip cards, it is after all possible to adapt the radio receiver individually to regional conditions. This makes it possible to manufacture one single radio receiver which does not require individual adaptations, specific to a particular country. It also allows the radio receiver to be manufactured such that it does not require an extensive memory.

It is of particular advantage to arrange the decoder and the evaluation unit for the traffic news on the chip card. This makes it possible for the radio receiver to become even cheaper, because the measures required for the evaluation of the traffic news do not have to be effected within the radio receiver, but are instead undertaken by a decoder and an evaluation circuit on the chip card. In particular, any further developments and improvements to be anticipated during the introductory phase are very easily realized by this measure, since only the chip card needs to be replaced. Another advantage is obtained by connecting the chip card with the radio receiver, via electrical contacts. This measure enables a safe transmission of the digital data. It is further advantageous to design the chip card such that it is withdrawable. This enables, on the one hand, a speedy replacement of the chip card, and, on the other hand, additional security can be obtained for the radio receiver, if the same can be operated only in conjunction with a security code on the chip card. Finally, the owner of a chip card can also use it in conjunction with other radio receivers, so that it is not necessary to have a separate chip card for each radio receiver. Furthermore, it is expedient to provide a voltage supply to the chip card via the radio receiver. This makes self-sufficient operation of the chip card possible, and no voltage sources are required in the chip card, which makes its manufacture simple and economic.

In its simplest version, the chip card for such a radio receiver contains a data memory with data of the vocabulary and the local code. In this case, the evaluation unit and the decoder must be accommodated in the radio receiver. In a further embodiment design of the chip card, it is of advantage to integrate the evaluation unit for the traffic news on the chip card. There are then no alterations required in relation to a commercial radio receiver, apart from the fact that the indicating device and the acoustic output must be suitably prepared for receiving information which is output by the chip card. It is expedient that the chip card is configured such that it has electrically contacts on its front side. This provides for a particularly reliable contact of the chip card with the radio receiver. Naturally, contactless transmission routes, for example, inductively, with high frequency, are possible. The chip card will also contain a security code to good advantage, which makes operation of the car radio possible only if the code stored on the chip card agrees with the code stored in the radio receiver.

BRIEF DESCRIPTION OF THE DRAWING

DETAILED DESCRIPTION OF THE PREFERRED EMBODIMENTS

Figure 1:
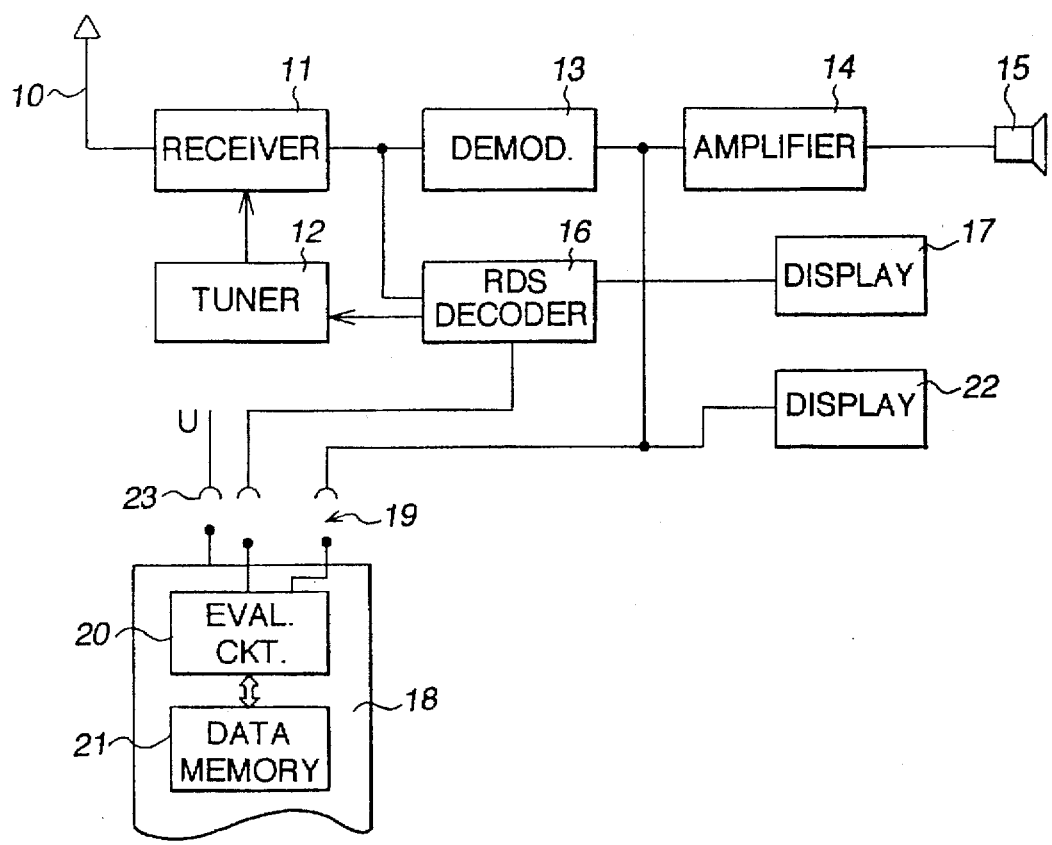

FIG. 1 shows an antenna 10, the antenna signal of which is fed to the radio receiver of the reception part 11 of a radio receiver. The radio receiver is in particular a vehicle radio receiver, such as those installed in motor vehicles. The reception part 11 is controlled by a tuning system 12 which is able to set radio stations or to search for them. The tuning system 12 is controlled by the RDS decoder 16, so that using the tuning system 12, it is possible to tune to the station which can be better received from among a group of stations, or to search for a suitable station. The output signal of the receiving part 11, which also embraces the intermediate frequency amplifier in a superheterodyne, is fed to a demodulator 13, which obtains a low frequency signal from a high frequency mixture. This low frequency signal is fed to an amplifier 14 which has a loudspeaker 15 connected to its output, so that the receiver signals are made audible.

Also connected to the receiving part 11 is the previously mentioned RDS decoder. The RDS decoder 16 evaluates the digital signals contained in the received frequency mixture and makes them available to the display 17, insofar as it concerns information transmitted in plain text, for example, via the station to be received. It also makes these digital signals available to data contacts 19. With the data contacts 19, a contact 23 is also provided which carries the supply voltage of the radio receiver. The data contacts 19 and the supply voltage contact 23 act together with a guide into which a solid state chip card 18 can be inserted. The chip card 18 contains on its one front side appropriate connections which correspond with the data contacts 19 and the supply voltage contact 23, so that after insertion, the contacts 19 and 23 are in contact with the corresponding contacts of the chip card. The chip card 18 contains the evaluation circuit 20 which is itself in contact with a data memory 21. The result of the evaluation is fed to the radio receiver via the data contacts 19 and is read out on the display unit 22, which can be identical with the display 17, or is fed to the amplifier via a speech synthesizer.

Figure 2:
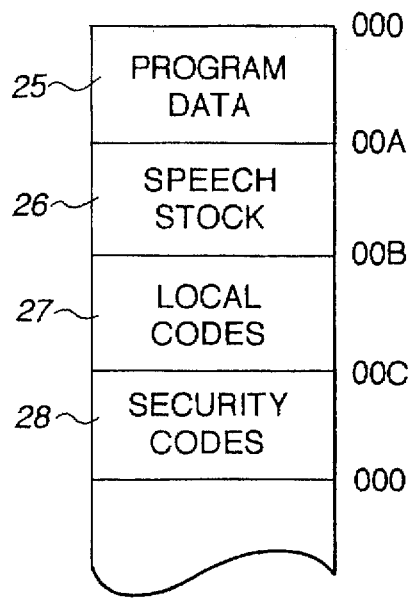

The data memory 21 is structured as shown in FIG. 2. In areas 000 to 00A, program data 25 are input which serve to control the evaluation unit 20. In areas 00A to 00B, the speech stock 26 is stored, in areas 00B to 00C, local codes 27 are stored, while area 00C to 00D contain the security codes 28.

The function of the circuit arrangement in accordance with FIG. 1 will now be explained in more detail. While the usual radio signal is received and processed, the digital signals from the decoder 16 are filtered out. The digital information received in plain text, and the received radio station are fed directly to the display unit 17, where they are displayed for the information of the vehicle driver. Further information will be passed to the evaluation unit 20. Based on the codes transmitted, the appropriate local codes are now called up from the memory 21. The standard texts are also called up from the speech stock 26 and are linked, together with the local information, to form an item of traffic information. If, for example, the towns of Hamburg, Hannover, Soltau-Süd, and Dorfmark are called up as local code from the memory 27, and from the speech stock, the information, "A . . . from . . . to . . . between . . . and . . . 3 km congestion", then the following traffic information will be composed: "A7 from Hamburg to Hannover, between Soltau-Süd and Dorfmark: 3 km congestion". This information is now fed via the data lines and the contact 19, to the display 22, or, if a speech synthesizer has been provided, is also fed in speech to the amplifier 14. It should be pointed out that the display unit 22 does not have to be an independent display, but that this display unit can be linked with the display unit 17. The composition of messages takes place on the basis of the program information 25, which is stored in the memory area 000 to 00A. As to how the encoding can be implemented in detail, is described in the DE-OS 35 36 820.

Depending on the area of travel and on the required language, different chip cards are possible. Whereas in one case, for example, the speech stock 26 has preformulated standard texts in German, the storage sector for the local code may contain the local codes of Germany, or the local codes of France or the local codes of Spain or the local codes of one Federal State of America. By using several chip cards, therefore, it is possible to make local codes for different countries available to the radio receiver, making information for the driver possible even when the radio receiver has been brought into another country, for example, if the driver wishes to listen to traffic information while motoring on holiday. The speech stock stored in the memory 26 is adaptable to the listener's language. For English speaking listeners, standard texts have been stored in English, for French speaking listeners in French, etc. In the previously detailed example, the transmission in English will be: "A7 from Hamburg to Hannover between Soltau-Süd and Dorfmark 2 miles congestion". Listeners from a foreign language background, therefore, can have the traffic information displayed in their own tongue or made available via the speech synthesizer. Speech synthesizers are electronic components which are already being sold to the public and which generate words from digital data and make these available as a low frequency signal.

Figure 3:
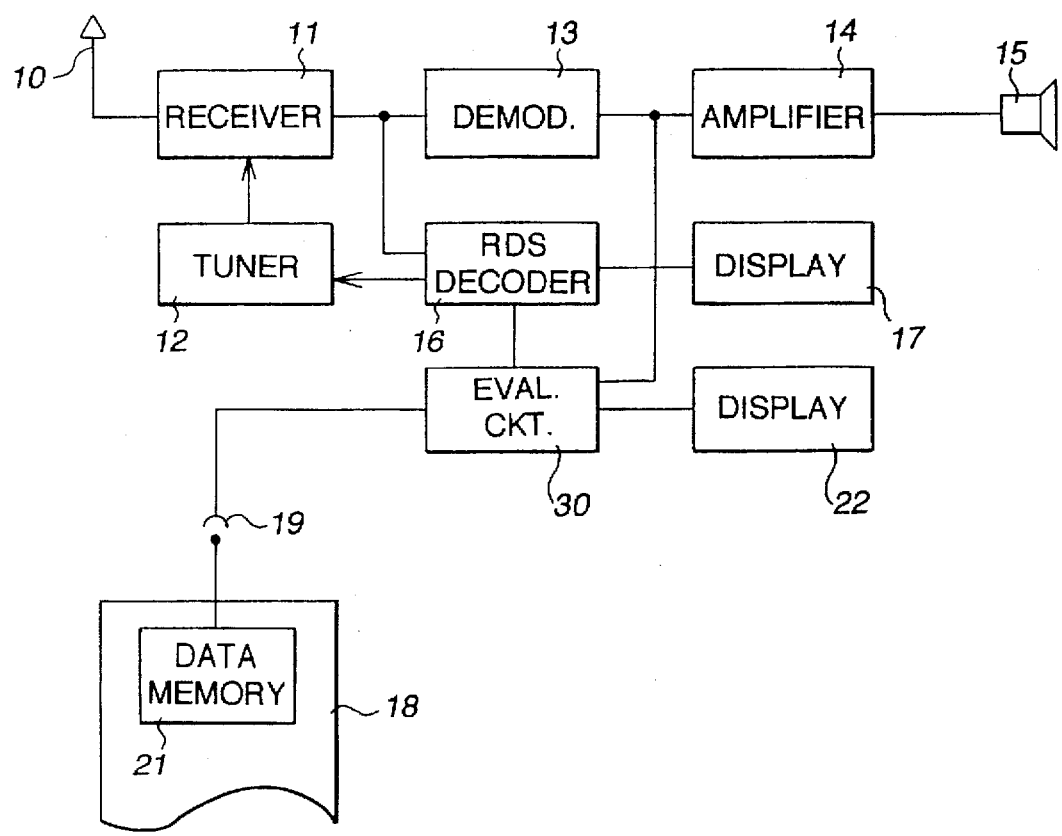

FIG. 3 shows a further embodiment example of the invention, in which identical modules are designated with identical ciphers. This radio receiver differs from that shown in FIG. 1 by virtue of the fact that the decoder and evaluation circuit 30 is a component part of the radio receiver. The digital data is fed from the RDS decoder to the decoder of the evaluation circuit 30. The evaluation circuit 30 passes the information which it transmits to the display unit 22 or, it passes the processed words as prepared by the speech synthesizer, to the amplifier 14. The decoder 30 now collects the data it requires, from the chip card 18, which merely contains the data memory 21, in which the storage may be structured similarly to that shown in FIG. 2. For the invention, it is however important, that it contains at least the speech stock in memory 26 and the local code in memory 27. Via the contacts 19, the addresses of the memory are now addressed and the corresponding data transferred into the decoder 30. This may, in certain circumstances, require a larger number of contacts, so that appropriate addressing and read-out of the data is possible. By addressing the chip card, specific local codes and language-specific standard texts are now called up, which are processed by the decoder and the evaluation unit 30. In this embodiment example, the tasks of the decoder or of the evaluation circuit have been displaced into the receiver, thereby making the manufacture of the receiver slightly more costly, but the chip card 18 easier to design.

It is furthermore advantageous if both in the design in accordance with FIG. 1 and in the design in accordance with FIG. 3, the chip card additionally contains a security code 28. In this case, the chip card is suitable, in a way that is generally known, to ensure an anti-theft safeguard for the radio receiver, since only the owner of the chip card is entitled and able to operate the radio receiver.

We claim:

1. A Radio Data System (RDS) receiver comprising:

a first receiving stage (11) connected to an antenna (10);

a tuning system (12) having an output which controls frequency setting in said first receiving stage (11);

an audio demodulator (13) coupled to an output of said first receiving stage (11);

an amplifier (14) coupled to an output of said audio demodulator (13);

speaker means (15) coupled to an output of said amplifier;

a Radio Data System (RDS) demodulator (16) coupled to the output of said first receiving stage (11), decoding traffic bulletins from a digitally encoded portion of a signal received at said antenna (10);

means for indicating said traffic bulletins to a user of the radio, by at least one of audio and visual means;

a plurality of removable chip cards (18), each said chip card including a data memory (21) and a traffic bulletin evaluation unit (20) connected with said data memory (21), and said data memory (21) includes:

at least a locality code area (27) having a plurality of geographical data relating to a specific locality, and a speech stock area (26) having data relating to speech used for speaking said plurality of geographical data in a desired language, with the desired language of one said chip card being different from the desired language of at least one other said chip card; and chip card reading means interfacing with said removable chip card for reading said geographical data and said speech data therefrom in response to said RDS demodulator and for supplying said traffic bulletins relating to said read plurality of geographical data and said read speech data to said means for indicating such that said traffic bulletins are indicated in said desired language.

2. The RDS receiver of claim 1, wherein said chip card reading means includes electrical contact means (19, 23).

3. The RDS receiver of claim 1, wherein said chip card reading means includes electrical contact means (19, 23).

4. A solid-state chip card, for engagement with a Radio Data System receiver having a chip card reading means, comprising:

a data memory (21), said data memory (21) including at least a locality code area (27) having a plurality of geographical data relating to a specific locality and a speech stock area (26) having data relating to speech used for speaking said plurality of geographical data in a desired language, with the desired language of one said chip card being different from the desired language of at least one other said chip card, and a traffic bulletin evaluation unit (20) connected with said data memory (21).

* * * * *